UNITED STATES PATENT OFFICE.

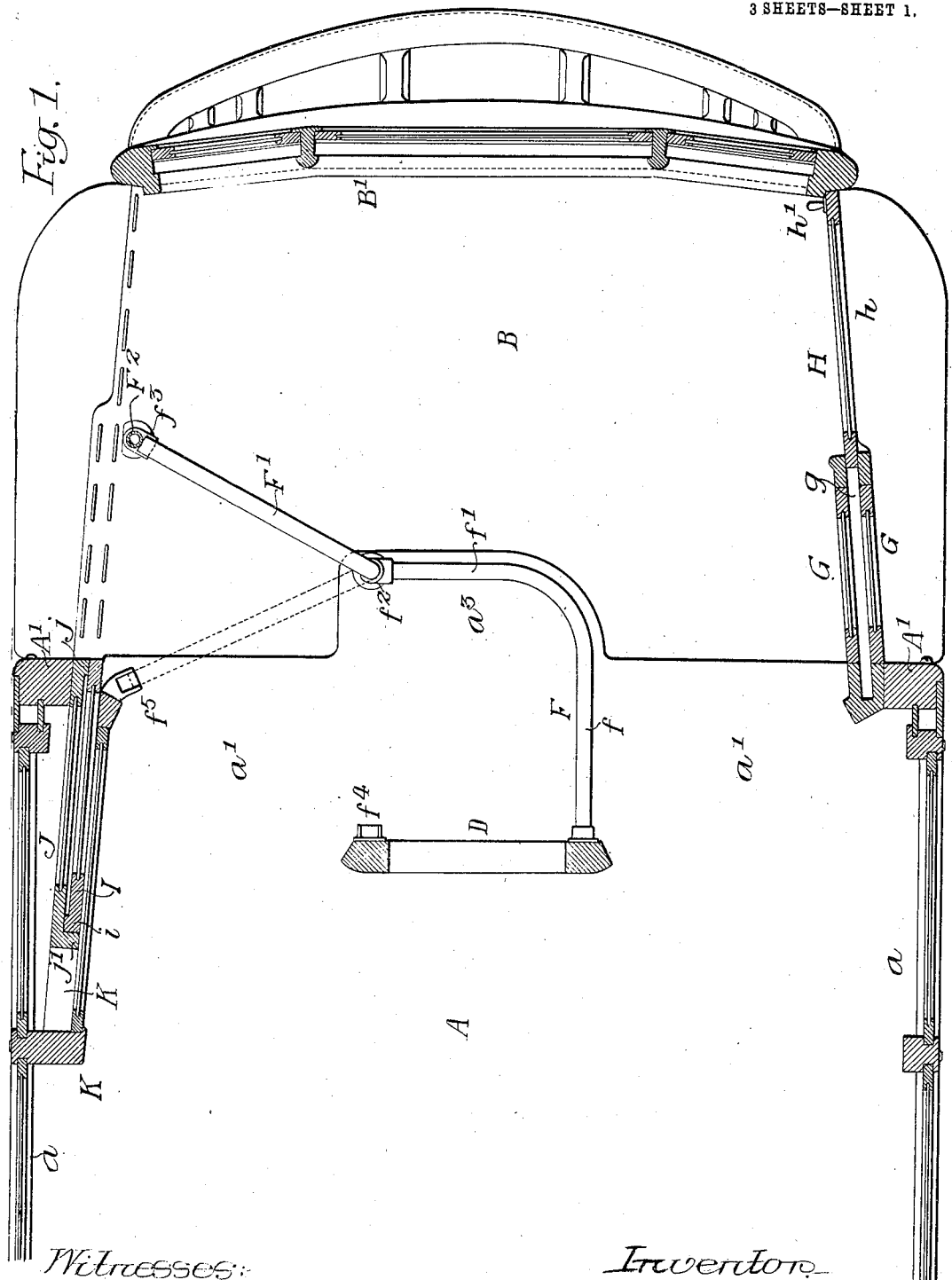

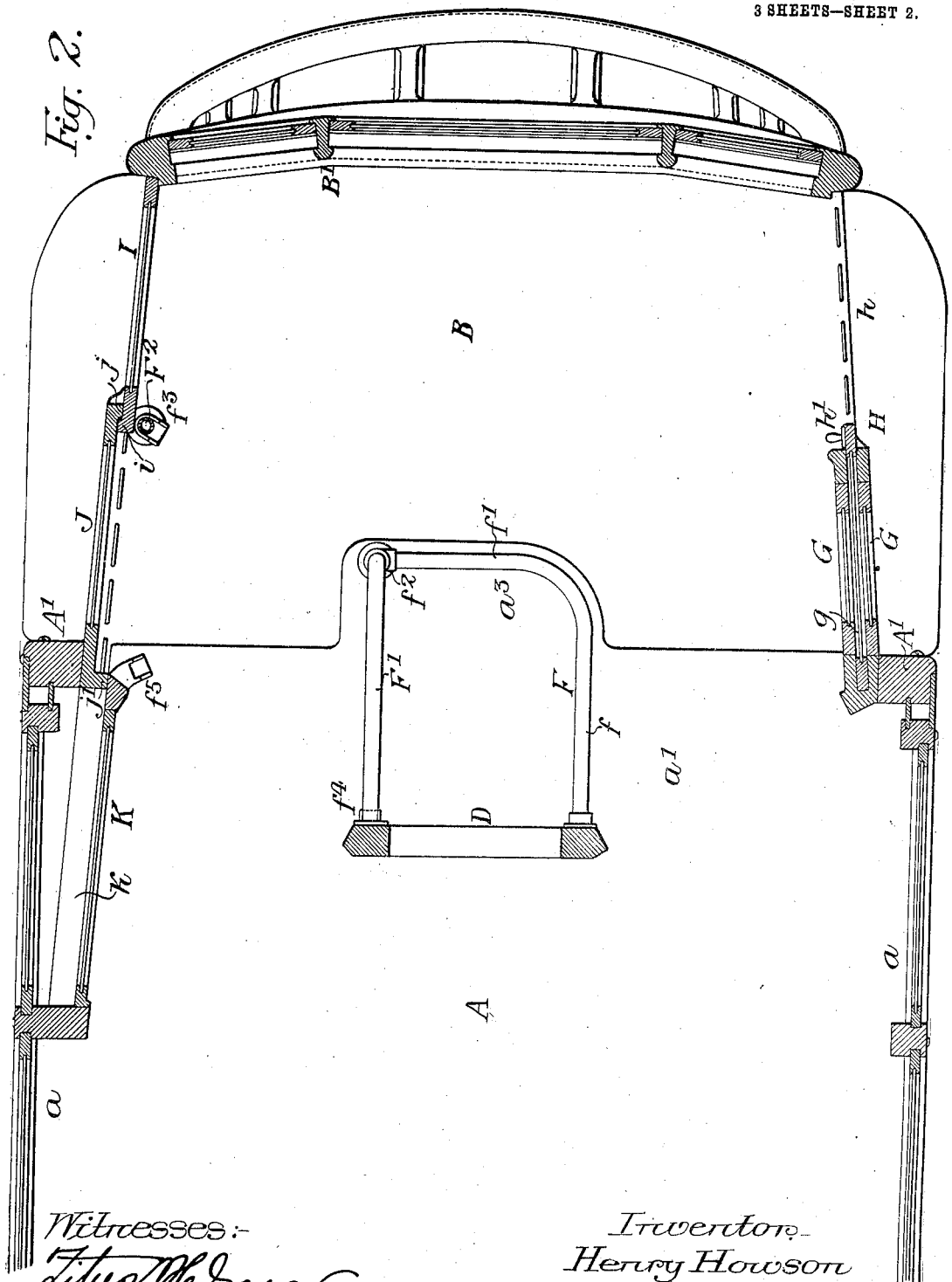

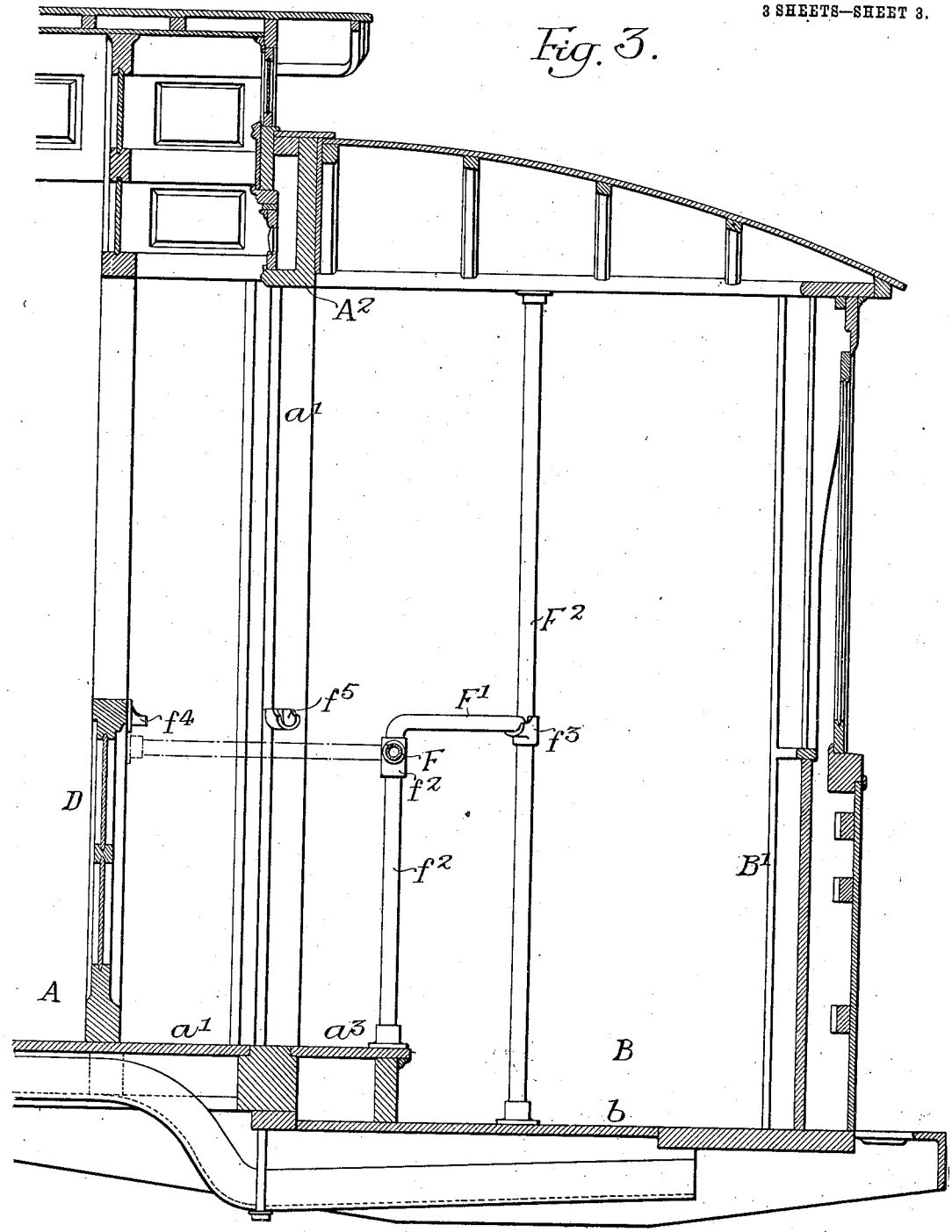

HENRY HOWSON, OF PHILADELPHIA, PENNSYLVANIA, ASSIGNOR TO THE J. G. BRILL COMPANY, OF PHILADELPHIA, PENNSYLVANIA, A CORPORATION OF PENNSYLVANIA.

PASSENGER-CAR.

No. 922,430.     Specification of Letters Patent.     Patented May 18, 1909.

Original application filed May 12, 1908, Serial No. 432,536. Divided and this application filed September 26, 1908. Serial No. 454,890.

*To all whom it may concern:*

Be it known that I, HENRY HOWSON, a citizen of the United States, residing in Philadelphia, Pennsylvania, have invented certain Improvements in Passenger-Cars, (being a division of application filed May 12, 1908, under Serial No. 432,536,) of which the following is a specification.

My invention relates to certain improvements in passenger cars of the type in which passengers pay their fares on entering the car, and particularly the type of car used on street and suburban railways.

One object of my invention is to convert an ordinary car into a pay-as-you-enter car without materially increasing the length of the platform and to provide an inclosed or partially inclosed space for the conductor on the floor of the body portion of the car, so as to allow ample room on the platform for passengers entering the car.

A further object of the invention is to provide an adjustable rail extending to the side of the platform so that it can be used either to divide the platform into ingress and egress sections, or to close the egress passageway, or to entirely inclose the space occupied by the conductor.

A still further object of the invention is to provide a sliding door at the side of the car which will successively close the sections of the platform.

These objects I attain in the following manner, reference being had to the accompanying drawings, in which:—

Figure 1, is a sectional plan view of one end of a passenger car illustrating my invention, the parts being in the position illustrated when the platform is at the rear end of the car; Fig. 2, is a view similar to Fig. 1, the parts being in the position illustrated when the platform is at the forward end of the car; and Fig. 3, is a longitudinal sectional view on the line 3—3, Fig. 1.

A is the body of a car having the usual sides $a, a$; B is the platform of the ordinary type having a front vestibule framing B'.

A', A' are the corner posts of the car and extending from one corner post to the other is a transverse partition $A^2$ having a wide doorway $a^2$ therein, and this partition separates the body of the car from the platform and is usually part of the main framework of the car.

The floor $a'$ of the body of the car is usually a step above the floor $b$ of the platform B; the edge of the floor $a'$ extending, as indicated in Fig. 1, in line with the outer edge of the corner posts A'.

In a car of the pay-as-you-enter type there must be a space set apart for the conductor, the conductor in this type of car does not leave his station to collect the fares but must be in position to receive fares from passengers after they alight on the platform and as they enter the body of the car. The conductor should also control the exit of the passengers at the rear end of the car and be in such position to control the movement of the door or gate which is arranged to close the side of the platform. In the present instance, in order to provide as much room as possible on the platform for the accommodation of passengers entering the car, I locate the space to be occupied by the conductor on the floor $a'$ of the body portion of the car and in this instance I form an extension $a^3$ of the floor of the body portion of the car, the said extension projecting over a portion of the platform as indicated in the drawings, and this space I inclose by a guard consisting in the present instance of a frame section D and a rail F, the rail extending from one side of the section D and curved and attached to a post $f^2$; the post in the present instance being mounted on the extension $a^3$ of the floor. Thus the rail has a longitudinal section $f$ and a transverse section $f'$. Pivoted to the guard at the post $f^2$ is an adjustable rail F' which is adapted to a socket $f^3$ on a vertical post $F^2$ at one side of the platform. This post is preferably arranged midway between one corner post of the car and the edge of the vestibule framework B' and divides the platform into ingress and egress passageways. On the framework of the car near one of the posts A' is a socket $f^5$ adapted to receive the free end of the rail F', as indicated by dotted lines in Fig. 1, when it is desired to close the egress passageway, and the rail can also be moved so as to rest in a socket $f^4$ on the framework D when it is desired to entirely close the space occupied by the conductor, leaving a free passage on either side of the inclosure. The rail is moved into the latter position when the platform is at the forward end of the car. By locating the space for the conductor on the floor of the body portion he is at such a height that he can have full view of the interior of the car, can readily see over the heads of passengers on the platform and is within easy reach of the doors closing the open sides of the platform.

The frame section D, which forms part of the inclosing guard for the conductor, may be made to extend to the roof of the car, or may terminate below the roof, or may be of the same height as the rail F. The construction will depend considerably upon the type of car.

G, G are fixed panels spaced apart to form a slideway $g$ for the sliding door H which closes the exit doorway $h$, and this door has a handle $h'$ and can be locked by any suitable device. The handle is in such position that when the platform is at the forward end of the car the door can be operated by the motorman; the doorway $h$ being the exit doorway when the platform is at the forward end, the opposite side of the car being closed. The opposite side of the platform B is closed in the present instance by a two-part sliding door adapted to a channel $k$ in a casing K built on the inside of the car. I is one section of the door and J is the other section. The section I has a flange $i$ at the inner end which engages a flange $j$ at the outer end of the section J when the section I is pulled out, so that the section J is drawn out with it, and on the rear end of the door section J is a flange $j'$ against which the section I abuts when it is moved in the opposite direction to open the passageways; the door section J being pushed back with the section I, as clearly illustrated in Fig. 1.

When the platform is at the rear of the car the parts are in the position shown in Fig. 1; the rail F' being mounted in a socket $f^3$ on the post F² dividing the platform into ingress and egress passageways.

The door sections I and J can be readily operated by the conductor, whose station is within the inclosure formed by the guards D and F. The conductor is protected by the inclosures and can rest against the rails when utilizing his hands in collecting fares, or can grasp the rails as handholds when necessary. The inclosure is preferably open, as indicated in Fig. 1, at the exit side so as to communicate with the egress passageway and the conductor has full control of the side of the platform to assist passengers alighting or boarding a car.

In closing the passageway at the side of the car the door I is first moved so as to close the egress passageway and on the continued movement of this door section it will close the ingress passageway, carrying with it the door section J which closes the egress passageway. When it is desired to open the passageway to allow passengers to enter and leave the car the door section I is first moved to open the ingress passageway and on the continued movement of the door section I it carries with it the door section J, opening the egress passageway.

In cars of this type the passengers enter the car only from the rear platform but may leave the car from the front platform and the rear platform, although experience has shown that comparatively few passengers leave the car by the rear platform, consequently by arranging the doors so that the ingress section of the platform will be open first the passengers boarding the car will seek first the open passageway so that when the exit passageway is opened it will be comparatively free and passengers can readily alight from the car without interfering with those entering the car through the ingress passageway.

The above construction will give practically as much room for the ingress of passengers as the present platform, as the conductor does not occupy any space on the platform and there is very little space cut off for the egress of passengers.

When the platform is at the forward end of the car then the door sections I and J are moved so as to close the ingress and egress passageways at one side of the car, and the dividing section of the rail is turned so as to engage the lugs $f^4$, as shown in Fig. 2. The door H can be opened by the motorman when a passenger desires to alight from the car and the door can be readily closed by him without moving from his post. This leaves a clear passage on each side of the central inclosure for the free egress of passengers from the body of the car to the front platform.

The inclosed space at the forward end of the car may be utilized for packages if desired, so as to prevent them accumulating in the aisles.

This application is a division of an application for Patent filed by me on the twelfth day of May 1908, under Serial Number 432,536, for improvements in passenger cars.

I claim:—

1. The combination in a passenger car, of a body portion, a platform, a guard at a point between the body portion and platform inclosing a space within the body portion to be occupied by the conductor and so situated as to divide the entrance to the body portion into two passageways.

2. The combination in a passenger car, of a body portion, a platform, a guard at a point between the body portion and platform inclosing a space within the body portion to be occupied by the conductor and so situated as to divide the entrance to the body portion into two passageways, with a guard extending from said inclosing guard to one side of the platform.

3. The combination in a passenger car, of a body portion, a platform, a guard at a point between the body portion and platform inclosing a space within the body portion to be occupied by the conductor and so situated as to divide the entrance to the body portion into two passageways, with an adjustable guard extending from said inclosing guard to a post at one side of the platform.

4. The combination in a passenger car, of a body portion, a platform, the floor of the body portion being above the floor of the platform, a guard inclosing a central space on the floor of the body portion adjacent the edge thereof leaving a passage on each side for the ingress or egress of passengers.

5. The combination in a passenger car, of a body portion, a platform open at one side, a guard extending to the open side of the platform and dividing said platform into ingress and egress sections, and a sliding door at one side of the car arranged to successively close the said two sections of the platform.

6. The combination in a passenger car, of a body portion, a platform open at one side, a guard extending to the open side of the platform and dividing said platform into ingress and egress sections, a sliding door made in a plurality of parts and arranged to successively close the said two sections of the platform.

7. The combination in a passenger car, of a body portion, a platform, corner posts at the junction of the body portion and the platform, the side of the body portion having a channel therein, a guard extending from a point near the center of the platform toward one side thereof to form two passageways, two sliding doors adapted to the channel and arranged to successively close that side of the platform to which the guard extends, one door sliding past the other and one door controlling the movement of the other door.

8. The combination in a passenger car, of a body portion, a platform, a guard dividing the platform into ingress and egress sections, passageways leading into the body of the car, a section of said guard being pivoted so as to swing into position to divide the platform into ingress and egress sections, or to swing to cut off the egress section and increase the ingress space of the platform.

9. The combination in a passenger car, of a body portion, a platform, a transverse partition separating the platform from the body of the car, and having ingress and egress doorways, a guard separating the platform into ingress and egress sections and extending to the partition, a section of said guard being pivoted, a post dividing one side of the platform into ingress and egress passageways, three sockets, one on the post, one at the corner of the car, and one on the partition to receive the end of the pivoted section of the guard so that the guard can be shifted and held in any one of its three positions.

In testimony whereof, I have signed my name to this specification, in the presence of two subscribing witnesses.

HENRY HOWSON.

Witnesses:
AUGUSTUS B. COPPES,
WM. A. BARR.